US007627318B2

(12) United States Patent
Yasuda

(10) Patent No.: US 7,627,318 B2
(45) Date of Patent: Dec. 1, 2009

(54) MOBILE COMMUNICATION TERMINAL WHICH SELECTS ONE OF A PLURALITY OF BASE STATIONS CORRESPONDING TO RESPECTIVE DIFFERENT COMMUNICATION STANDARDS TO COMMUNICATE WITH, BASED ON ESTIMATED DATA THROUGHPUTS OF THE BASE STATIONS, AND METHOD THEREFOR

(75) Inventor: Chikara Yasuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 459 days.

(21) Appl. No.: 11/396,863

(22) Filed: Apr. 3, 2006

(65) Prior Publication Data
US 2008/0004020 A1 Jan. 3, 2008

(30) Foreign Application Priority Data
Nov. 10, 2005 (JP) ............................. 2005-326432

(51) Int. Cl.
*H04W 36/00* (2009.01)
*H04W 36/08* (2009.01)
*H04W 36/30* (2009.01)
*H04W 24/00* (2009.01)

(52) U.S. Cl. .................. 455/436; 455/437; 455/425; 455/525; 455/552.1; 370/331; 370/332

(58) Field of Classification Search .............. 455/436, 455/452.2, 552.1
See application file for complete search history.

(56) References Cited

U.S. PATENT DOCUMENTS

| | | | |
|---|---|---|---|
| 6,219,550 B1 * | 4/2001 | Kanerva et al. | 455/436 |
| 7,024,194 B1 * | 4/2006 | Oksanen | 455/437 |
| 2002/0187784 A1 * | 12/2002 | Tigerstedt et al. | 455/439 |
| 2003/0002460 A1 * | 1/2003 | English | 370/331 |
| 2004/0005906 A1 * | 1/2004 | Okumura et al. | 455/500 |
| 2004/0053630 A1 * | 3/2004 | Ramos et al. | 455/500 |
| 2004/0109424 A1 * | 6/2004 | Chheda | 370/331 |
| 2005/0064872 A1 * | 3/2005 | Osseiran et al. | 455/452.1 |
| 2005/0143071 A1 * | 6/2005 | Jaakkola et al. | 455/436 |
| 2006/0030323 A1 * | 2/2006 | Ode et al. | 455/436 |
| 2009/0154426 A1 * | 6/2009 | Perraud et al. | 455/436 |

FOREIGN PATENT DOCUMENTS

| | | | |
|---|---|---|---|
| GB | 2314731 A | * | 1/1998 |
| JP | 2004-208001 A | | 7/2004 |

* cited by examiner

*Primary Examiner*—Nick Corsaro
*Assistant Examiner*—Tangela T. Chambers
(74) *Attorney, Agent, or Firm*—Frishauf, Holtz, Goodman & Chick, P.C.

(57) ABSTRACT

A mobile communication terminal has a function of communicating with two types of base stations, for example, one base station belongs to the Global System for Mobile communications (GSM) and another base station belongs to the Wideband Code Division Multiple Access (WCDMA) system. The mobile communication terminal receives radio signal from a communicating base station and a neighboring base station, and measures received radio signal quality. Then, judging whether hand-over process is to be executed or not based upon comparison of the measured received radio signal quality and relationship between the received radio signal quality and data throughput.

11 Claims, 11 Drawing Sheets

MOBILE COMMUNICATION TERMINAL WHICH SELECTS ONE OF A PLURALITY OF BASE STATIONS CORRESPONDING TO RESPECTIVE DIFFERENT COMMUNICATION STANDARDS TO COMMUNICATE WITH, BASED ON ESTIMATED DATA THROUGHPUTS OF THE BASE STATIONS, AND METHOD THEREFOR

CROSS-REFERENCE TO RELATED APPLICATION

This application is based upon the benefit of priority from the prior Japanese Application No. P2005-326432, filed Nov. 10, 2005, the entire contents of which are incorporated herein by reference.

FIELD OF THE INVENTION

The present invention relates to a mobile communication terminal having a hand-over control function.

DESCRIPTION OF THE RELATED ART

In a cellular type mobile communication system, a mobile communication service area is divided into small-scale areas called as cells, and a base station is placed in each cell. When a mobile communication terminal device is located in some cell, it establishes a wireless line with the base station placed in the cell concerned.

Furthermore, when a mobile communication terminal moves from some cell to another cell adjacent to the cell concerned, the mobile communication system carries out hand-over processing. That is, the mobile communication system switches the base station to be communicated with the mobile communication terminal from the base station placed in the cell where the mobile communication terminal is located before it moves to the base station set up in the other cell where the mobile communication terminal is to be located after it moves, and keeps the communication quality of the mobile communication terminal.

According to the CDMA (Code Division Multiple Access) system, etc., a mobile communication terminal receives a radio wave transmitted from a base station which the mobile communication terminal is establishing a connection and radio waves transmitted from base stations adjacent to the base station concerned (Neighboring Cells), and measure the communication quality of each of the radio waves thus received. When the mobile communication terminal receives a radio wave having higher quality than a radio wave transmitted from a base station which the mobile communication terminal is establishing a connection, the mobile communication system carries out the hand-over processing of setting the base station transmitting the high-quality radio wave as a base station to which the mobile communication system should newly communicate.

Here, when the mobile communication terminal can be operated in a dual mode, that is, it can communicate with plural mobile communication systems and also the mobile communication terminal concerned is located in cells of plural mobile communication systems at the same time, the mobile communication systems do not select a base station on the basis of the quality of radio waves, but determine on the basis of the characteristics of these mobile communication systems a base station of a mobile communication service which the mobile communication terminal should communicate, thereby providing excellent services to users.

For example, in the case of a mobile communication terminal of a dual mode that can communicate with a cellular type mobile communication system and a wireless LAN (Local Area Network) type communication system, the communication speed of the wireless LAN type communication system is still higher than the communication speed of the cellular type mobile communication system, and thus the mobile communication terminal has high performance, that is, carries out high-speed communications by communicating an access point of the wireless LAN type communication system.

However, the size of each cell of the wireless LAN type communication system is still smaller than that of the cellular type mobile communication system, and thus when the mobile communication terminal is moving at high speed, it carries out the processing of selecting a base station of the cellular type mobile communication system and communicating the base station concerned (for example, see JP-A-2004-208001 (pp 2-4, FIG. 1).

However, in the method disclosed in the above publication, the dual mode type mobile communication terminal locating in the cells of the plural cellular type mobile communication systems at the same time, it is impossible to specify a mobile communication system whose base station should be communicated with the mobile communication terminal in order to achieve high performance.

For example, with respect to a mobile communication terminal located in cells of two mobile communication systems at the same time, one mobile communication system being a cellular type mobile communication system of 2nd generation (2G) or 2.5G, and the other mobile communication system being a mobile communication system of 3rd generation (3G) that is slightly larger in cell size and slightly higher in communication speed, it is impossible to specify one of the mobile communication systems the base station of which should be communicated with the mobile communication terminal in order to achieve high performance.

SUMMARY OF THE INVENTION

The present invention has been implemented in view of the foregoing situation, and has an object to provide a communication system, a mobile communication terminal and a control station that makes it possible to specify a mobile communication system whose base station should be communicated with a dual-mode mobile communication terminal located in cells of plural cellular type mobile communication systems at the same time in order to achieve high performance.

In order to attain the above object, according the present invention, there is provided a communication system for carrying out data communications between a mobile communication terminal and a control station through base stations of plural mobile communication systems in which the mobile communication terminal comprises a throughput storage unit for storing the association between the quality of a radio wave transmitted from a base station of a mobile communication system when the radio wave concerned is received and the throughput of the data communication concerned every mobile communication system, a radio wave quality, for example RSSI (Received Signal Strength Indicator), measuring unit for receiving the radio wave transmitted form the base station of the mobile communication system and measuring the radio wave quality of the radio wave thus received, and a hand-over necessity judging unit for transmitting, to the control station, a hand-over request for requesting hand-over to a base station of a mobile communication system having a higher throughput among the throughputs stored in the throughput storage unit in association with the radiowave quality measured by the radio wave quality measuring unit, and the control station has a hand-over unit for receiving the hand-over request transmitted from the mobile communication terminal and instructing hand-over processing to the base stations of the plural mobile communication systems.

According to the present invention, there can be provided the communication system, the mobile communication terminal and the control station that make it possible to specify a mobile communication system whose base station should be communicated with a dual-mode mobile communication terminal located in cells of plural cellular type mobile communication systems at the same time in order to achieve high performance.

DETAILED DESCRIPTION OF THE INVENTION

One embodiment of a communication system, a mobile communication terminal and a control station according to the present invention will be described with reference to the accompanying drawings.

First Embodiment

Figure 1:
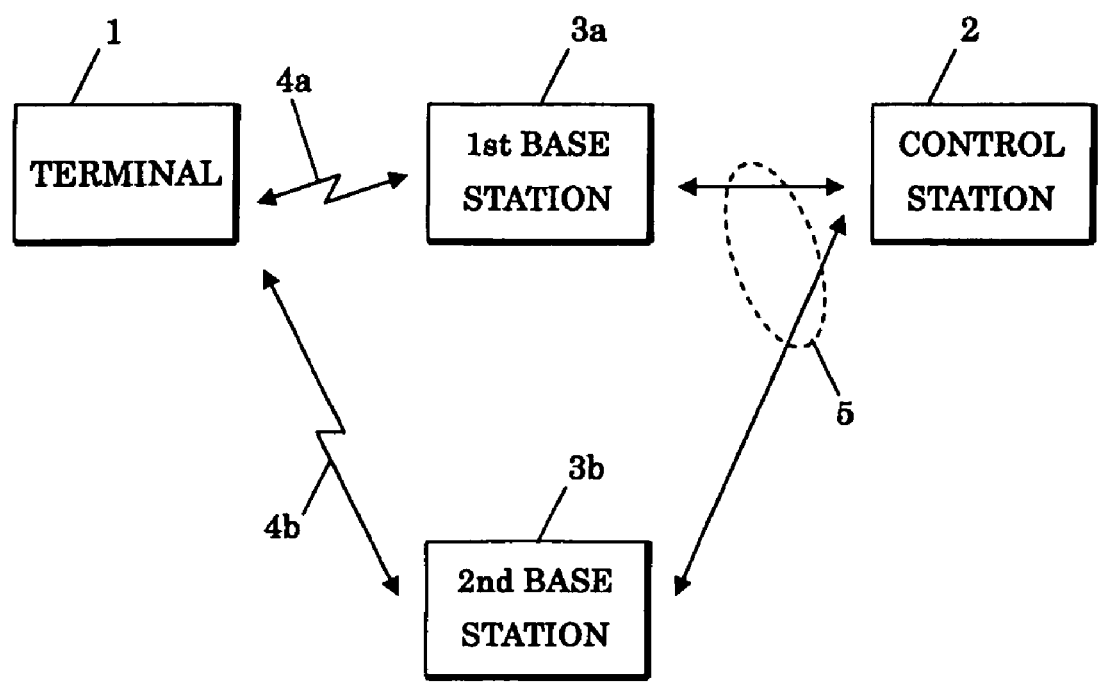
FIG. 1 is a block diagram showing the configuration of a communication system.

FIG. 1 is a block diagram showing the configuration of a communication system according to a first aspect of the present invention. The communication system comprises a mobile communication terminal 1, a control station 2, a base station 3a (hereinafter referred to as first base station) of a first mobile communication system for connecting the mobile communication terminal 1 and the control station 2, and a base station (hereinafter referred to as second base station) 3b of a second mobile communication system for connecting the mobile communication terminal 1 and the control station 2.

Furthermore, the communication system contains a first wireless communication network 4a for connecting the mobile communication terminal 1 and the first base station 3a, a second wireless communication network 4b for connecting the mobile communication terminal device 1 and the second base station 3b, and a wired communication network 5 for connecting the first base station 3a and the second base station 3b to the control station 2.

Here, it is assumed that the first base station 3a and the first wireless communication network 4a belong to the first mobile communication system, and the second base station 3b and the second wireless communication network 4b belong to the second mobile communication system. For example, the first mobile communication system is the 2G mobile communication system, and a cell covered by one base station is small in size, and the speed of a data communication channel is low. On the other hand, the second mobile communication system is the 3G mobile communication system, and a cell covered by one base station is large in size, and the speed of the data communication channel is high.

Figure 2:
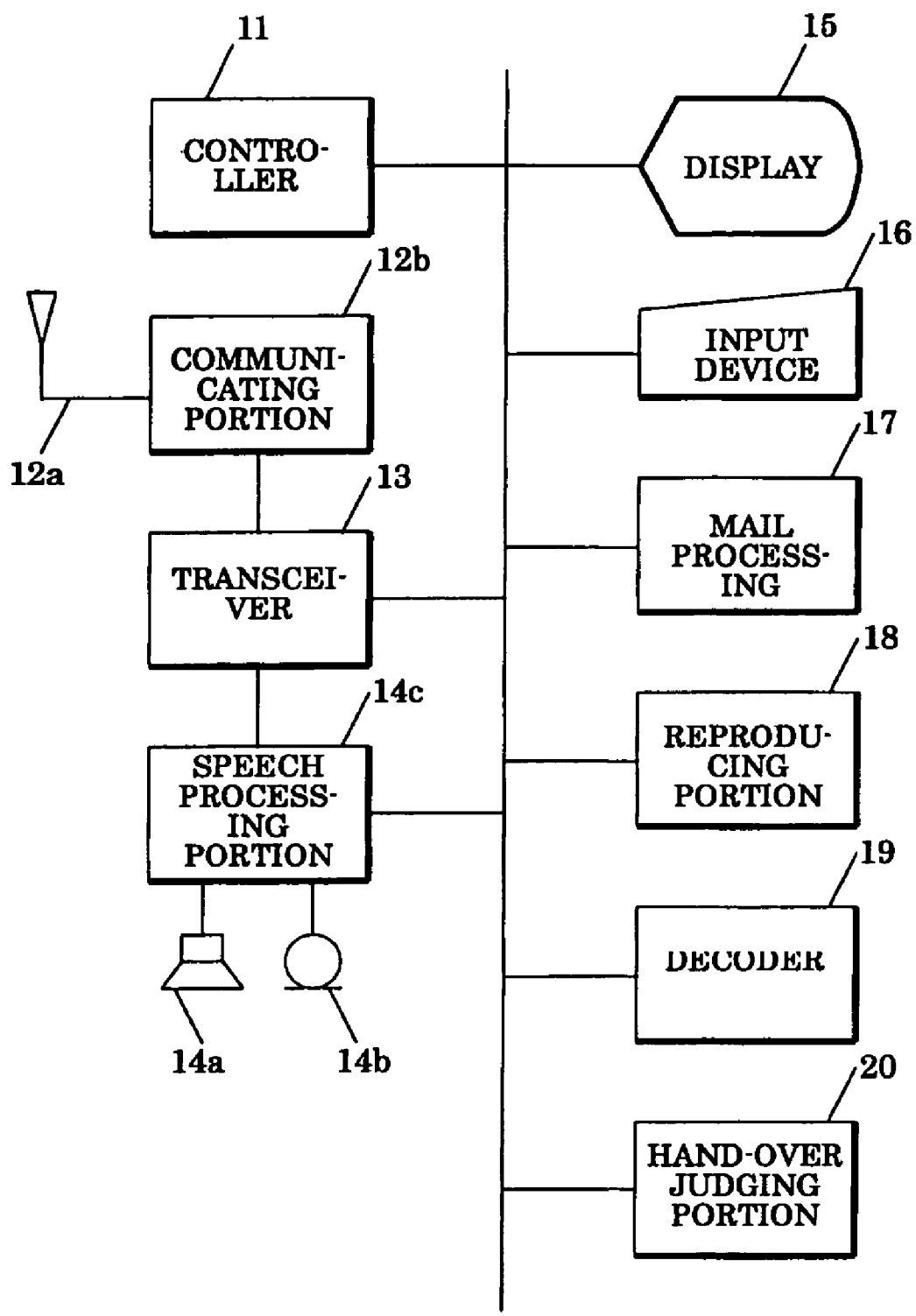
FIG. 2 is a block diagram showing the configuration of the mobile communication terminal according to the first embodiment.

FIG. 2 is a block diagram showing the configuration of the mobile communication terminal 1 according to the first embodiment of the present invention. The mobile communication terminal 1 comprises a controller 11 for controlling the overall terminal, an antenna 12a for transmitting/receiving radio waves between the first base station 3a and the second base station 3b, a communicating portion 12b, a transceiver 13, a speaker 14a, a microphone 14b, a speech processing portion 14c, a display portion 15, an input device 16, an electronic mail processing function 17, a stream reproducing portion 18, a decoder 19 and a hand-over judging portion 20.

Figure 3:
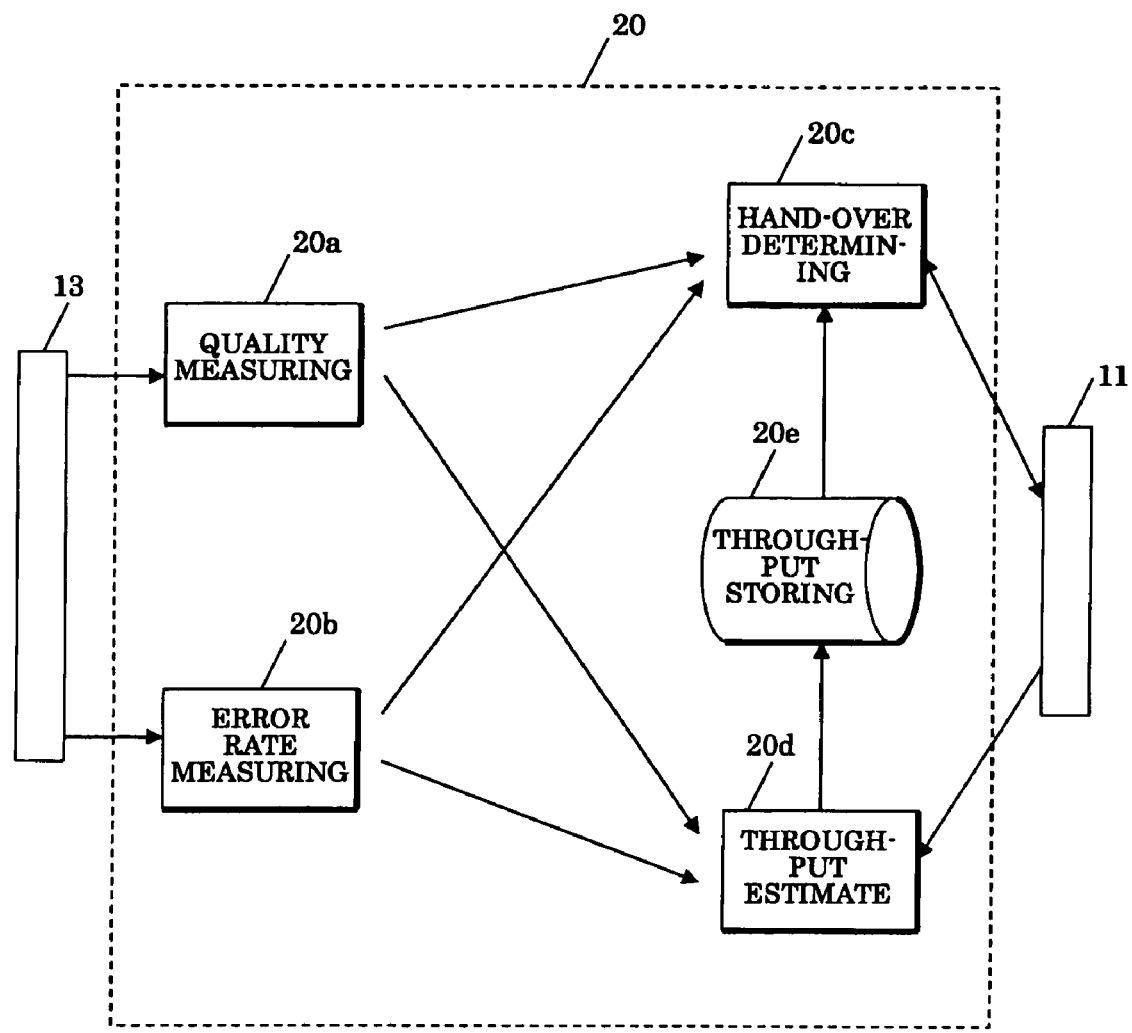
FIG. 3 is a block diagram showing the hand-over judging portion according to the first embodiment.

FIG. 3 is a block diagram showing the detailed construction of the hand-over judging portion 20. the hand-over judging portion 20 comprises a received radio wave quality measuring portion 20a connected to the transceiver 13, a received signal error rate measuring portion 20b connected to the transceiver 13, a hand-over determining portion 20c connected to the controller 11, a throughput estimating portion 20d connected to the controller 11, and a throughput storing portion 20e.

Figure 4:
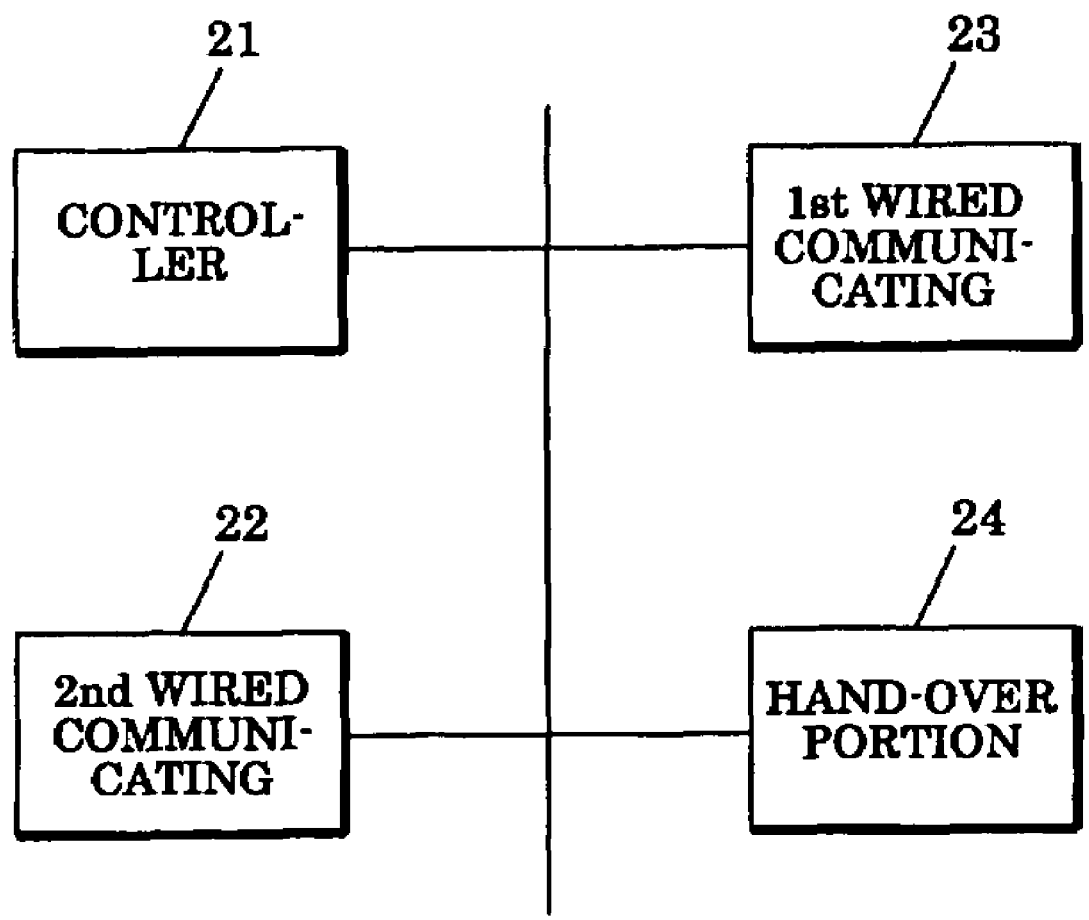
FIG. 4 is a block diagram showing the control station.

FIG. 4 is a block diagram showing the configuration of the control station 2 according to the first embodiment of the present invention. The control station 2 comprises a controller 21, a first wired communicating portion 23, a second wired communicating portion 22 and a hand-over portion 24.

Next, the operation of each part of the communication system thus constructed will be described with reference to FIG. 1 to FIG. 8.

First, the operation of each part constituting the mobile communication terminal 1 will be described.

As described below, the controller 11 detects which one of two application processors, that is, the electronic mail processing function 17 and the stream reproducing portion 18 is under operation, and also detects the throughput of the data communication of these processors. Furthermore, the controller 11 notifies the processor under operation and the throughput to the hand-over judging portion 20 at a predetermined time interval. The controller 11 also detects the mobile communication system which terminal 1 is communicating with. Furthermore, when it is notified from the hand-over judging portion 20 that hand-over is carried out, the controller 11 transmits a control signal instructing hand-over through the first base station 3a or the second base station 3b to the control station 2 to request hand-over.

For example, in a case where the control station 2 does not receive the control signal indicating the hand-over transmitted from the mobile communication terminal 1, receives the radio wave quality when receiving an radio wave transmitted from the first base station 3a and the radio wave quality when receiving an radio wave transmitted from the second base station 3b, and determines on the radio wave qualities thus received whether the hand-over should be carried out or not, the controller 11 does not transmit the control signal indicating the hand-over to the control station 2. In place of the control signal, the controller 11 transmits to the control station 2 a value lower than the radio wave quality measured by the received electrical wave quality measuring portion 20a described later as the radio wave quality when receiving the radio wave transmitted from the base station under communication (any one of the first base station 3a and the second base station 3b), and transmits to the control station 2 a value higher than the radio wave quality measured by the reception electrical wave quality measuring portion 20a as the radio wave quality when receiving the radio wave transmitted from a hand-over designation base station (which is any one of the first base station 3a and the second base station 3b, and is not the base station under communication).

When the control station 2 determines on the basis of other information transmitted from the mobile communication terminal 1 whether hand-over is carried out or not, the controller 11 operates the information and transmits it to the control station 2, thereby transmitting the determination of executing the hand-over to the control station 2.

The communicating portion 12b outputs a high frequency signal received by the antenna 12a to the transceiver 13, and transmits a high frequency signal output from the transceiver 13 through the antenna 12a. The transceiver 13 subjects the high frequency signal from the communicating portion 12b to amplification, frequency-conversion and demodulation, and transmits the signal thus achieved to the hand-over judging portion 20 while adding a pilot signal to the signal concerned. Furthermore, the transceiver 13 transmits an achieved digital audio signal to the communicating portion 14c, and also transmits a digital data signal and a control signal to the controller 11. Furthermore, the transceiver 13 subjects a digital audio signal output from the communicating portion 14c and a digital data signal and a control signal output from the controller 11 to modulation, frequency-conversion and amplification to achieve a high frequency signal, and transmits the high frequency signal to the communicating portion 12b.

The communicating portion 14c converts the digital audio signal output from the transceiver 13 to an analog audio signal, amplifies the analog audio signal and then transmits it to a speaker 14a. Furthermore, the communicating portion 14c amplifies an audio signal output from the microphone 14b, converts the audio signal to a digital audio signal and then transmits it to the transceiver 13.

The display portion 15 is controlled by the controller 11 to carry out a display operation of characters, numerals and image data. The data to be displayed are switched upon instruction from the controller 11 in response to an input operation or incoming signal from the input device 16.

The input device 16 comprises keys and functional keys for inputting the telephone number of a communication partner, the title, body text, transmission destination address, etc. of an electronic mail. When a key of the input device 16 is operated, the identifier of the key concerned is notified to the controller 11, and a character such as a letter or the like is displayed on the display portion 15 by the controller 11, and also the control based on the function corresponding to the identifier concerned is carried out.

Subsequently, the electronic mail processing function 17 starts the receiving operation of an electronic mail at the time when the controller 11 is actuated after the controller 11 receives the incoming signal of the electronic mail. It receives the title and body text of the reception mail through the controller 11, and stores them into a storage portion (not shown). When an attachment file is attached to the received mail, the attachment file is also stored in the storage portion.

When the an electronic mail browsing function is selected by operating a predetermined key of the input device 16, the electronic mail processing function 17 is actuated by the controller 11 and displays the title and body text of the received mail stored in the electronic mail processing function 17 on the display portion 15.

Furthermore, when the attached mail is attached to the received mail concerned and a predetermined key is operated, the electronic mail processing function 17 reads out the file concerned from the storage portion and displays it on the display portion 15. If the file is an encoded file, the decoder 19 is actuated to decode the file concerned.

Furthermore, when an electronic mail transmitting function is selected by operating a predetermined key of the input device 16, the electronic mail processing function 17 is actuated by the controller 11, and puts the title and body text of the mail by operating a predetermined key of the input device. When the attachment of a file is designated by operating a predetermined key of the input device 16, the designated file is read out from the storage portion, and attached as the attachment file. Then, the electronic mail processing function 17 transmits a transmission request of the electronic mail to be transmitted to the controller 11.

When the stream reproducing function is selected by operating a predetermined key of the input device 16, the stream reproducing portion 18 is actuated by the controller 11. The stream reproducing portion 18 requests a content server (not shown) connected to the control station 2 to transmit a content, for example movie, indicated by operating a predetermined key of the input device. Furthermore, the stream reproducing portion 18 receives through the controller 11 content information which is encoded and transmitted by the content server in response to the request, stores the content information concerned into the storage portion (or buffer) and then carries out stream reproduction. That is, when the information concerned is received and a predetermined information amount is stored, the decoder 19 is actuated, the content is received and stored, and the stored content is decoded.

Furthermore, the stream reproducing portion 18 receives a change of the reception speed of the content from the controller 11, and requests the content server to transmit the content at the received speed. The content server device transmits the content at the requested speed by changing the coefficient, for example quantization step size, for encoding the content, or by thinning out or adding information constituting the content.

The decoder 19 is actuated by the electronic mail processing function 17 or the stream reproducing portion 18, and decodes the indicated content information. The decoder 19 outputs a decoded video content to the display portion 15 and also outputs a decoded audio content to the speaker 14a.

Next, the operation of the hand-over judging portion 20 will be described with reference to FIG. 3. The received radio wave quality measuring portion 20a receives a common pilot signal from the first base station 3a which is transmitted from the transceiver 13, and measures the quality of the signal. Furthermore, the quality measuring portion 20a receives a common pilot signal from the second base station 3b which is output from the transceiver 13, and measures the quality of the signal. Then, it transmits these measured radio wave qualities to the hand-over determining portion 20c and the throughput estimating portion 20d. Here, the radio wave quality may be estimated by using the strength of the common pilot signal or the ratio of the signal power and the interference noise power of the signal.

The received signal error rate measuring portion 20b receives the signal from the first base station 3a which is transmitted from the transceiver 13 and demodulated, and measures the error rate of the signal. Furthermore, the received signal error rate measuring portion 20b receives the signal from the second base station 3b which is transmitted from the transceiver 13 and demodulated, and measures the error rate of the signal. Then, the error rate measuring portion 20b transmits the error rates thus measured to the hand-over determining portion 20c and the throughput estimating portion 20d.

Here, the throughput which is estimated by the throughput estimating portion 20d and stored in the throughput storage portion 20e will be described.

Figure 5:
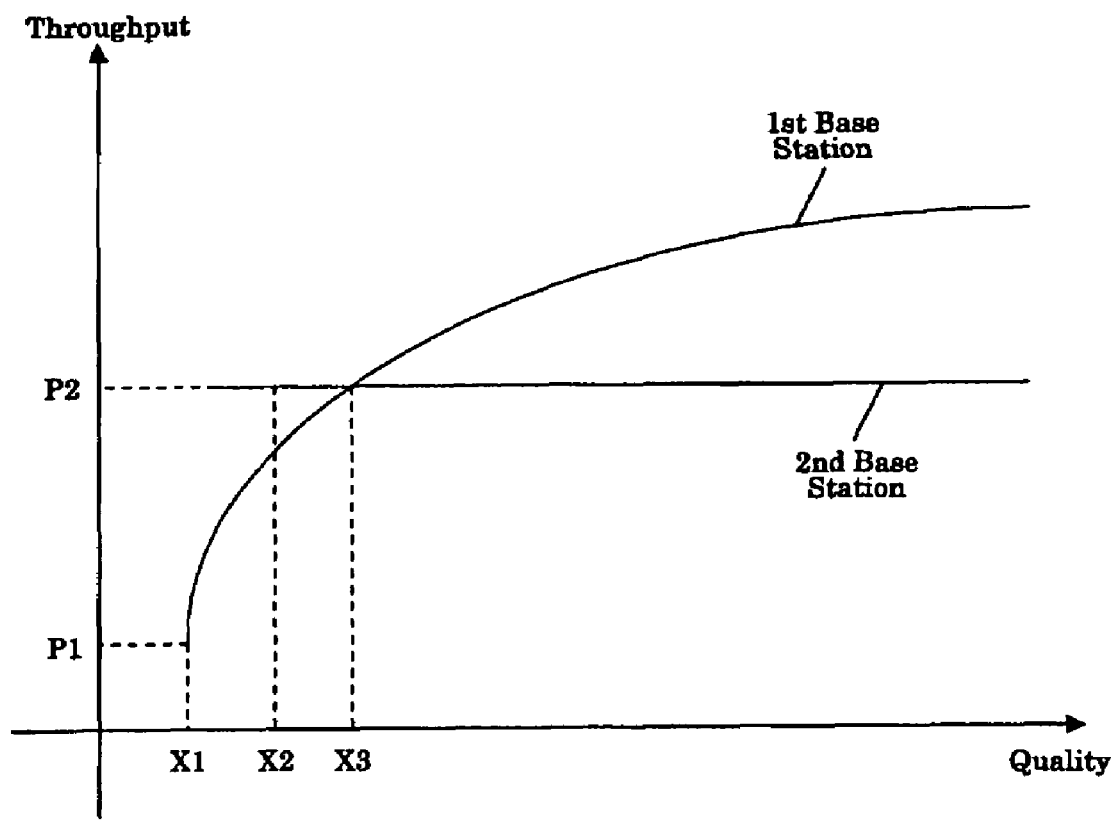
FIG. 5 shows an example of the throughput stored in the throughput storage portion.

FIG. 5 shows an example of the throughput stored in the throughput storage portion 20e in graph form. Here, the throughput is stored as a function of the radio wave quality. The throughput is based on the information measured by the controller 11, and stored with respect to each function, that is, stored while the throughput under the data communication carried out by the electronic mail processing function 17 and the throughput under the data communication carried out by the stream reproducing portion 18 are discriminated from each other. This discrimination is omitted in the following description. Furthermore, the throughput may be stored with respect to each channels through which data communication is carried out. Furthermore, the radio wave quality is the quality measured by the received radio wave quality measuring portion 20a described above.

It is shown in FIG. 5 that with respect to the throughput associated with the first base station 3a, it is equal to P2 when the radio wave quality is equal to X2 or more. That is, the worst radio wave quality in the neighborhood of the boundary of the cell of the first mobile communication system is X2, and if the radio wave quality is equal to X2 or more, the throughput is equal to a fixed value P2.

Furthermore, it is also shown in FIG. 5 that with respect to the throughput associated with the second base station 3b, it is equal to P1 at the worst radio wave quality X1 in the neighborhood of the boundary of the cell of the second mobile communication system, and the throughput is increased as the radio wave quality is enhanced from X1, that is, the mobile communication terminal 1 approaches to the second base station 3b. Here, X1<X2, and P1<P2.

Furthermore, as the radio wave quality is enhanced, that is, as the mobile communication terminal 1 moves toward to the second base station 3b, at the radio wave quality X3, the throughput is equal to P2, and further as the electrical wave quality is enhanced and exceeds X3, the throughput exceeds P2. Here, X2<X3.

As described above, the speed of the communication channel with the second base station 3b belonging to the second mobile communication system is higher than the speed of the communication channel with the first base station 3a belonging to the first mobile communication system, however, the cell of the second mobile communication system is large. Therefore, the radio wave quality is worse in the neighborhood of the boundary of the cell than that in the neighborhood of the boundary of the cell of the first mobile communication system, so that the throughput is lower. In the neighborhood of the second base station 3b, the radio wave quality is enhanced, so that the throughput is increased in connection with the speed of the communication channel with the second base station 3b belonging to the second mobile communication system.

Figure 6:
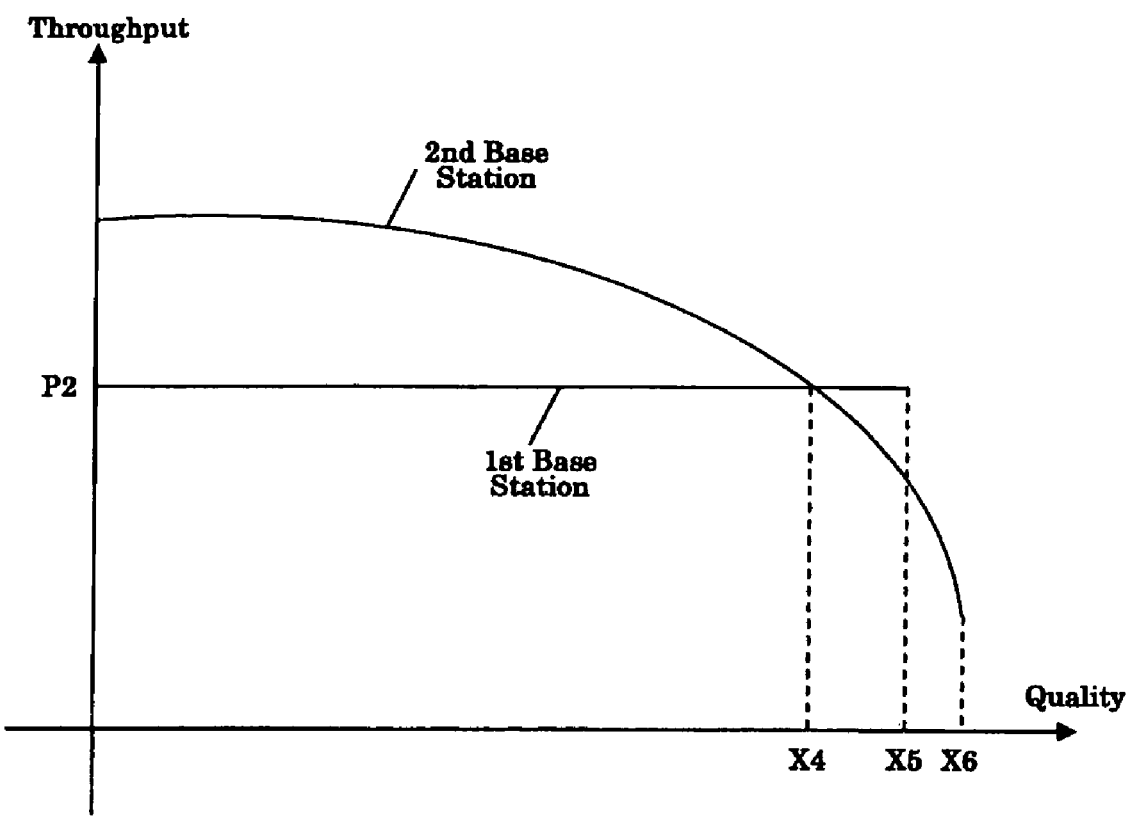
FIG. 6 shows another example of the throughput stored in the throughput storage portion.

FIG. 6 shows another example of the throughput stored in the throughput storage portion 20e in graph form. Here, the throughput is stored as a function of the error rate. As described above, the throughput is based on the information measured by the controller 11, and stored every with respect to each functions. However, this discrimination is omitted from the following description. The error rate is an error rate measured by the received signal error rate measuring portion 20b.

It is shown in FIG. 6 that the throughput associated with the first base station 3a is fixed to P2 when the error rate is equal to X5 or less. Here, the highest error rate in the neighborhood of the boundary of the cell of the first mobile communication system is equal to X5. On the other hand, the throughput associated with the second base station 3b is dependent on the error rate. That is, the throughput is higher as the error rate is smaller, and the throughput is lower than the error rate is larger. When the error rate is equal to X4, the throughput is equal to P2. Here, X4<X5. Furthermore, as the error rate increases from X4 to X5 and further increases to X6, the throughput is lowered. Here, the highest error rate in the neighborhood of the boundary of the cell of the second mobile communication system is equal to X6.

In the foregoing description, the throughput is stored as a function of the radio wave quality which does not decrease in connection with increase of the radio wave quality, or an error rate function which does not increase in connection with increase of the error rate, however, the throughput is not limited to the above description. For example, it may be stored as a function of the radio wave quality and the error rate. Furthermore, the throughput may be stored as the function of the radio wave quality and/or the error rate indicating the maximum value of the throughput and the function of the radio wave quality and/or the error rate indicating the minimum value of the throughput. Furthermore, it may be stored as the function of the radio wave quality and/or the error rate and the function indicating the dispersion degree from the value indicated by the function concerned.

In the foregoing description, the throughput is shown in graph form, and specifically it is stored as a continuous function. However, the throughput of the present invention is not limited to this description. For example, the throughput may be set as a stepwise function, and specifically it may be stored in tubular form.

Next, the operation of the hand-over determining portion 20c will be described. The hand-over determining portion 20c is a device for determining the necessity of hand-over on the basis of the radio wave quality transmitted from the received radio wave quality measuring portion 20a, the error rate transmitted from the received signal error rate measuring portion 20b and the throughput stored in the throughput storage portion 20e while the mobile communication terminal 1 is operating data communications.

Figure 7:
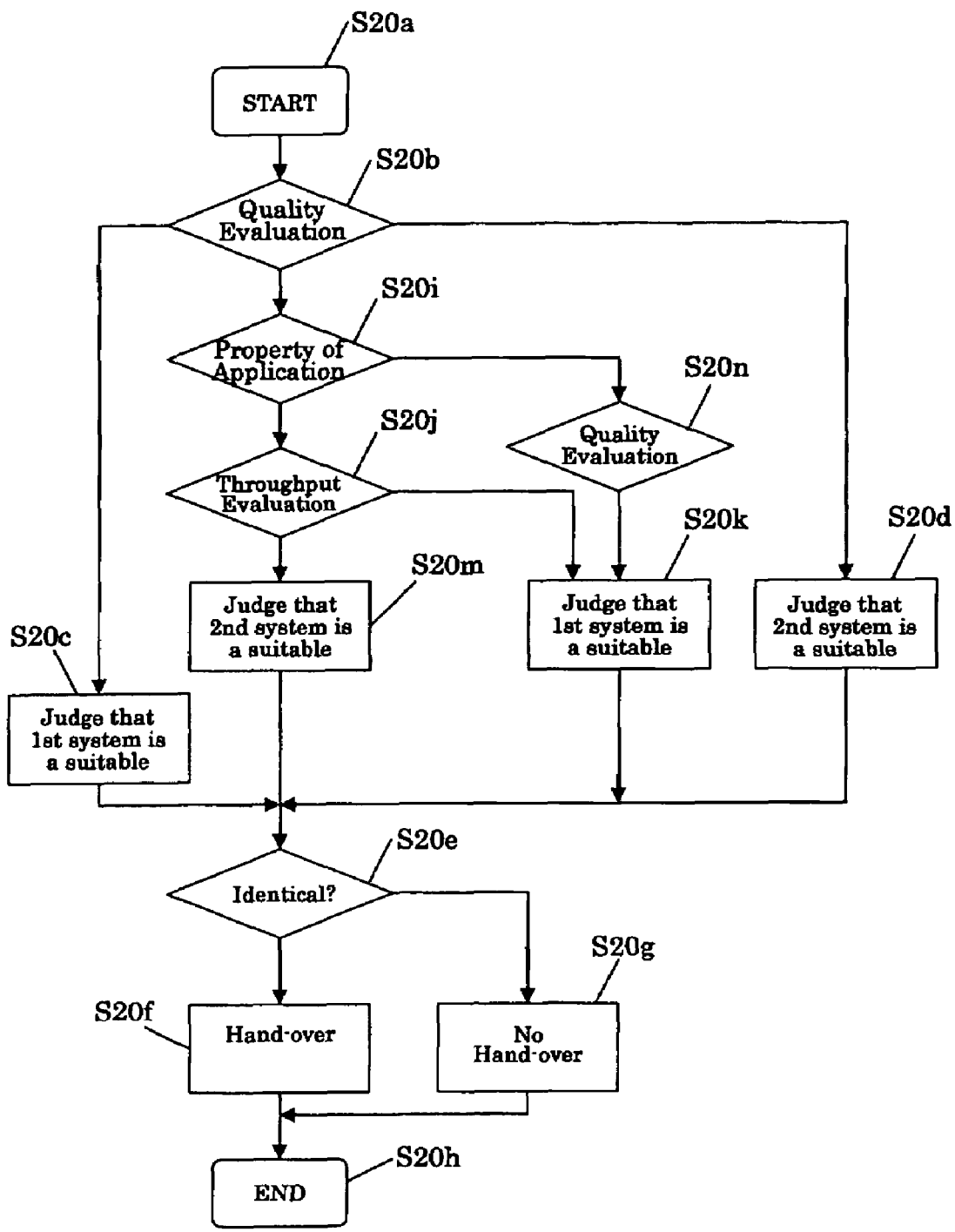
FIG. 7 is a flowchart showing the operation of the hand-over determining portion.

FIG. 7 is a flowchart showing the operation of the hand-over determining portion 20c. The determination as to the necessity of the hand-over between the first base stations 3a, the determination as to the necessity of hand-over the second base stations 3b and the determination of the necessity of hand-over while the mobile communication terminal 1 is making a call are carried out by a well-known method, and thus the description thereof is omitted.

The hand-over determining portion 20c is actuated at a predetermined interval by the control 11 to start its operation while the mobile communication terminal 1 operates data communication. At this time, identification information of the application processor under the data communication and the mobile communication system under communication are given as arguments (step S20a).

Next, the hand-over determining portion 20c selects a base station candidate of the hand-over destination, and thus receives the quality of the radio wave from the base station under communication transmitted from the received radio wave quality measuring portion 20a, the quality of the radio wave from the first base station 3a (excluding the base station under communication) and the quality of the radio wave transmitted from the second base station 3b (excluding the base station under communication). By comparing the quality of the radio wave transmitted from the first base station 3a with a predetermined threshold value, it is estimated whether hand-over to the first base station 3a is possible or not. Furthermore, by comparing the quality of the electrical wave transmitted from the second base station 3b with a predetermined threshold value, it is estimated whether hand-over to the second base station 3b is possible or not (step S20b).

When it is estimated that the communication with only the first mobile communication system is possible, that is, the hand-over to only the first base station 3a is possible, and also the base station under communication is the first base station 3a, the hand-over determining portion 20c is judged that the first mobile communication system is suitable as the system to be communicated (step S20c). On the other hand, when it is estimated that the communication with only the second mobile communication system is possible, that is, the hand-over to only the second base station 3b is possible, and the base station with which the terminal 1 is communicating is the second base station 3b, the second mobile communication system is suitable as the system to be communicated (step S20d). It is checked whether the mobile communication system with which the terminal 1 is communicating is identical to or different from the mobile communication system which is judged as being suitable as the system to be communicated (step S20e).

Next, when the mobile communication system with which the terminal 1 is communicating is different from the mobile communication system which is judged as being suitable as the system to be communicated (step S20f), the hand-over determining portion 20c determines that the hand-over is executed. On the other hand, when both the mobile communication systems are identical to each other, it determines that the hand-over is not executed (step S20g), notifies the determination to the controller 11 and then finishes the operation (step S20h).

The determination that the hand-over is not executed in step S20g does not necessarily mean that the hand-over between the first base stations 3a, the hand-over between the second base stations 3b or the hand-over when the mobile communication terminal 1 is making a call is not executed. As described above, these hand-over processing is carried out by a well-known method, and the description thereof is omitted.

When passing through the operation of the step S20c subsequent to the operation of the step S20b or the operation of the step S20d subsequent to the operation of the step S20b, it is clear in step S20e that the mobile communication system with which the terminal 1 is communicating is judged as being identical to the mobile communication system which is judged as being suitable as the system to be communicated. Therefore, the operation of the step S20g of determining that no hand-over is carried out may be carried out with omitting the judging operation of the step S20e.

When it is determined that the hand-over is carried out, the throughput of the data communication is frequently varied by the hand-over. The variation may affect the operation of the application processing function under data communication. Therefore, when it is determined that the hand-over is carried out, the hand-over determining portion 20c predicts the throughput of the data communication after the hand-over from the throughput storage portion 20e, and notifies the thus-determined throughput to the controller 11.

When the communication with the first mobile communication system is possible and also the communication with the second mobile communication system is possible in step S20b, that is, the hand-over to the first base station 3a is possible and the base station with which the mobile communication terminal 1 is communicating is the second base station 3b, and when the hand-over to the second base station is possible and the base station under communication is the first base station 3a, the hand-over determining portion 20c checks whether the property of the application processing function under data communication which is notified from the controller 11 is based on a stream system or a file transfer system (step S20i).

Here, the stream system is defined as the processing that data to be communicated are transmitted to another processing function simultaneously with the communication of the data concerned while keeping a predetermined extra amount, and the stream reproducing portion 18 is an example of the processor of the stream system. That is, the stream reproducing portion 18 receives content data and makes the decoder 19 decode the received content data while keeping a predetermined extra amount.

On the other hand, the file transfer system is defined as the processing that the communication of all the data to be communicated, for example, all the data of one file is completed, and then the communicated data are transmitted to another processing function, and the electronic mail processing function 17 is an example of the processing function of the file transfer system. That is, the electronic mail processing function 17 waits until the communication of all the information of one electronic mail is finished and then notifies the end of the communication to the controller 11 irrespective of whether any attachment file is attached or not.

When the property of the application processing function under data communication is based on the file transfer system in step S20i, the temporary reduction of the data communication speed does not directly lead to degradation in performance of the mobile communication terminal 1. For example, the reduction of the reception speed of the electronic mail received by the electronic mail processing function 17 leads to the degradation in performance of the mobile communication terminal 1 after affecting the average value of the reception speed until reception of one electronic mail is completed.

Therefore, when the property of the application processor under data communication is based on the file transfer system, the hand-over determining portion 20c judges that the communication with the base station of a mobile communication system having a high throughput is proper in order to carry out the communication having a high average value in data communication speed. That is, the throughput in the case of the communication with the first base station 3a (the base station under communication or the base station of the hand-over destination) is compared with the throughput in the case of the communication with the second base station 3b (the base station under communication or the base station of the hand-over destination), and they are estimated in magnitude (step S20j).

Here, in order to achieve the throughput, the hand-over determining portion 20c may determine the throughput achieved on the basis of the radio wave quality measured by the received radio wave quality measuring portion 20a from the throughput storage portion 20e, or determine the throughput achieved from the error rate measured by the reception signal error rate measuring portion 20b. Furthermore, it may determined the throughput from the radio wave quality and the error rate.

When the throughput in the case of the communication with the first base station 3a is estimated to be larger than the throughput in the case of the second base station 3b, the hand-over determining portion 20c judges the first mobile communication system as being suitable as the system to be communicated (step S20k), determines whether hand-over is executed or not as in the case of the step S20e and the subsequent steps thereto as described above, and then finishes the operation.

On the other hand, when the throughput in the case of the communication with the second base station 3b is estimated to be larger than the throughput in the case of the first base station 3a, the hand-over determining portion 20c judges the second mobile communication system as being suitable as the system to be communicated (step S20m), determines whether hand-over is executed or not as in the case of the step S20e and the subsequent steps thereto as described above, and then finishes the operation.

On the other hand, in the case where the property of the application processing function under data communication is based on the stream system in step S20j, when the speed of the data communication is reduced to a value lower than a predetermined value even temporarily, it directly leads to the performance degradation of the mobile communication terminal 1. For example, when the reception speed of a content received by the stream reproducing portion 18 is reduced to a value lower than a predetermined value even temporarily, some breaks may occur in pictures and sounds which are decoded by the decoder 19 and then output to the display portion 15 and the speaker 14a.

Therefore, when the property of the application processing function under data communication is based on the stream system, in order to avoid the performance degradation, the hand-over determining portion 20c judges that it is proper to make the communication with a base station whose mobile communication system has a stable data communication speed. That is, as in the case of the estimation carried out in step S20b, it is estimated which one of the quality of the radio wave transmitted from the first base station 3a (the base station with which the terminal 1 is communicating or the base station of the hand-over destination) which is transmitted from the received radio wave quality measuring portion 20a and the quality of the radio wave transmitted from the second base station 3b (the base station under communication or the base station of the hand-over destination) is better than the other quality (step S20n).

If it is estimated that the quality of the radio wave transmitted from the first base station 3a is higher than the quality of the radio wave transmitted from the second base station 3b and also the communication with the first base station 3a is better because the communication is stable, the hand-over determining portion 20c judges the first mobile communication system as being suitable as the system to be communicated (step S20k), determines whether the hand-over should be carried out or not in the step S20e and the subsequent steps thereof a described above, and then finishes the operation.

On the other hand, when it is estimated that the quality of the radio wave transmitted from the second base station 3b is higher than the quality of the radio wave transmitted from the first base station 3a and thus the communication with the second base station 3b is better because the communication is stable, the hand-over determining portion 20c judges the second mobile communication system as being suitable as the system to be communicated (step S20d), determines whether the hand-over should be carried out or not in the step S20e and the subsequent steps thereof a described above, and then finishes the operation.

When the property of the application processing function under data communication is based on the stream system in step S20i, the hand-over determining portion 20c compares the quality of the radio wave transmitted from the first base station 3a with the quality of the radio wave transmitted from the second base station 3b in step S20n, and determines that the hand-over to the base station transmitting the radio wave having high quality is carried out. However, the present invention is not limited to this style.

For example, when the throughput based on the communication with the second base station 3b exceeds the maximum value of the throughput based on the communication with the communication with the first base station 3a (the maximum value of the throughput of the data communication based on the 2G mobile communication system), it may be judged that the second mobile communication system is suitable as the system to be communicated. Furthermore, when the difference between the quality of the radio wave transmitted from the first base station 3a and the quality of the radio wave transmitted from the second base station 3b is smaller than a predetermined value, it may be judged that the mobile communication system to which a base station having a large throughput is suitable as the system to be communicated. In this case, in order to avoid increase of the load based on the hand-over load or increase in power consumption, it may be determined that no hand-over is carried out.

When it is estimated in step S20b that the hand-over to the first base station 3a is impossible and also the hand-over to the second base station 3b is impossible, the hand-over determining portion 20c notifies the above fact to the controller 11 and finishes the operation (not shown in the flowchart).

Next, the operation of the throughput estimating portion 20d will be described. The throughput estimating portion 20d is a function for estimating the function type of the throughput on the basis of the quality of the radio wave transmitted from the received radio wave quality measuring portion 20a, the error rate transmitted from the received signal error rate measuring portion 20b and the throughput of the data communication when the radio wave quality or the error rate is measured, which is transmitted from the controller 11, and stores the function type thus estimated into the throughput storage portion 20e.

When receiving the radio wave quality or the error rate and the throughput as described above by a predetermined frequency or more, the throughput estimating portion 20d estimates the function types of the radio wave quality or the error rate and the throughput by using the least square method every reception, and stores these function types into the throughput storage portion 20e. Even when the throughput of the data communication transmitted from the controller 11 varies temporarily by the throughput thus stored, the throughput can be properly estimated from the radio wave quality or the error rate without being affected by the variation.

As described in the description on the throughput storage portion 20e, the throughput estimating portion 20d distinctively stores the throughput in the case of the data communication carried out by the electronic mail processing function 17 and the throughput in the case of the data communication carried out by the stream reproducing portion 18 by using the information for identifying the processor under operation transmitted from the controller 11. Furthermore, the throughput of the first mobile communication system and the throughput of the second mobile communication system are stored in distinction from each other. Furthermore, they may be stored in distinction from each other every first base station 3a or every second base station 3b.

When the throughput estimating portion 20d cannot estimate the function type of the throughput because it does not receive the radio wave quality or the error rate, the information for identifying the above function and the throughput by a predetermined frequency or more, it stores a predetermined function type into the throughput storage portion 20e. Furthermore, it may store a predetermined function type into the throughput storage portion 20e irrespective of the information receiving frequency. The throughput associated with the first base station 3a shown in FIG. 5 is an example corresponding to the function type described above.

Furthermore, when predetermined function types are stored in the throughput storage portion 20e for the first base station 3a and the second base station 3b, the hand-over judging portion 20 may be designed so as to have no throughput estimating portion 20d, and the throughput storage portion 20e may be designed so that a predetermined function type is stored as an initial value therein.

Next, the operation of each part constituting the control station 2 will be described. The first wired communicating portion 23 communicated with the first base station 3a and the second base station 3b through the wired communication network 5. The control signal transmitted from the first base station 3a or the second base station 3b is transmitted to the controller 21, and the audio signal and the data signal are transmitted to the second wired communicating portion 22. The control signal transmitted from the controller 21 and the audio signal and the data signal transmitted from the second wired communicating portion 22 are transmitted to the first base station 3a or the second base station 3b. The second wired communicating portion 22 communicates with a switching center (not shown) through a wired communication network (not shown).

The hand-over portion 24 starts its operation when receiving through the controller 21a control signal representing the judgment of execution of hand-over, which is transmitted from the mobile communication terminal 1, and instructs the base station of the hand-over destination (any one of the first base station 3a and the second base station 3b) to communicate with the mobile communication terminal 1. Furthermore, the controller 21 instructs the base station before the hand-over (any one of the first base station 3a and the second base station 3b, and also it is not the base station of the hand-over destination) to cease the communication with the mobile communication terminal 1.

As described above, in this case, the hand-over corresponds to the hand-over between the first base station 3a and the second base station 3b which is carried out while the mobile communication terminal 1 carries out data communication, and the hand-over between the first base stations 3a, the hand-over between the second base station 3b and the hand-over while the mobile communication terminal 1 is making a call are carried out by well known methods, and thus the description thereof is omitted.

Figure 8:
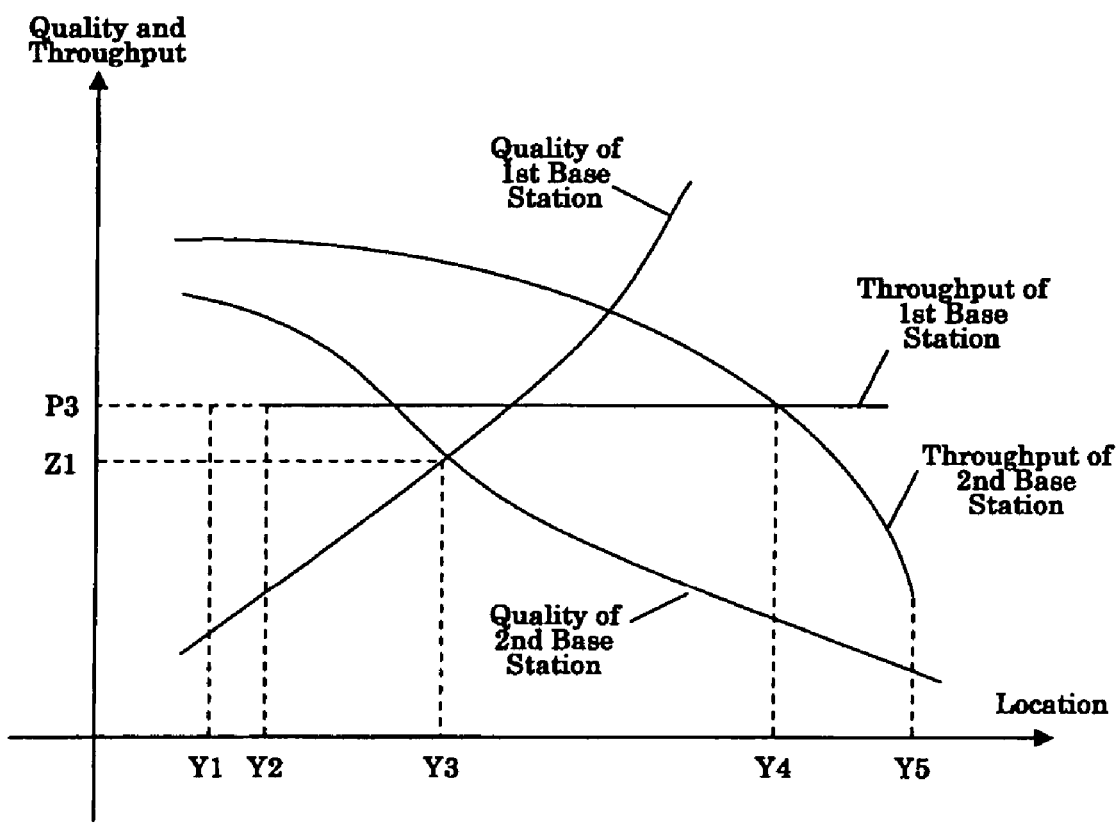
FIG. 8 shows the variance of the quality of the radio wave and throughput that accompany the movement of the mobile communication terminal.

Next, an example in which the mobile communication terminal 1 moves from the neighboring position of the second base station 3b to the neighboring position of the first base station 3a to thereby carry out hand-over will be described with reference to FIG. 8.

In this case, it is assumed that the hand-over judging portion 20 uses the throughput which is stored in association with the quality of the received radio wave in the throughput storage portion 20e, however, the present invention is not limited to this case. The hand-over judging portion 20 may use the throughput which is stored in association with the error rate of the received signal in the throughput storage portion 20e.

When the mobile communication terminal 1 is located at a position Y1 in the neighborhood of the second base station 3b and communicates with the second base station 3b, the quality of the radio wave transmitted from the second base station 3b is high and the throughput based on the communication with the second base station 3b is high. On the other hand, the quality of the radio wave transmitted from the first base station 3a is lower than a predetermined value and thus it is impossible to carry out the hand-over to the first base station 3a. That is, the throughput based on the communication with the first base station 3a is equal to zero.

Therefore, at the position Y1, the mobile communication terminal 1 continues the communication with the second base station 3b (corresponding to the step S20d of the flowchart of FIG. 7), and determines that no hand-over is carried out (corresponding to the step S20g of the flowchart of FIG. 7).

The mobile communication terminal 1 moves to the first base station 3a side, and at a position Y2, the quality of the radio wave transmitted from the first base station 3a is higher than the quality of the radio wave at the position Y1 and equal to the predetermined value, and thus the hand-over to the first base station 3a is possible, thereby achieving the throughput based on the communication with the first base station 3a. Here, the throughput based on the communication with the first base station 3a is assumed to be equal to a fixed value P3. However, at the position Y2, the quality of the radio wave transmitted from the second base station 3b is higher than the quality of the radio wave transmitted from the first base station 3a and also the throughput based on the communication with the second base station 3b is higher than the throughput based on the communication with the first base station 3a.

Therefore, the mobile communication terminal 1 judges that it is suitable to continue the communication with the second base station 3b irrespective of the application on which the data communication being carried out is based (the step S20d of the flowchart shown in FIG. 7 or the step S20m), and determines that no hand-over is carried out (corresponding to the step S20g of the flowchart of FIG. 7).

The mobile communication terminal 1 further moves to the first base station 3a side, and at a position Y3 the quality of the radio wave transmitted from the first base station 3a exceeds the quality Z1 of the radio wave transmitted from the second base station 3b. However, the throughput based on the communication with the second base station 3b is higher than the throughput based on the communication with the first base station 3a.

At this time, when the data communication being carried out is the communication based on the file transfer system by the electronic mail transceiver 17, the mobile communication terminal 1 judges that it is suitable to continue the communication with the second base station 3b having the higher throughput in order to select the communication in which the average communication speed over a long term is high (corresponding to the step S20m of the flowchart of FIG. 7), and determines that no hand-over is carried out (corresponding to the step S20g of the flowchart shown in FIG. 7).

On the other hand, when the communication being carried out is the communication based on the stream system by the stream reproducing portion 18, the mobile communication terminal 1 judges that it is suitable to communicate with the first base station 3a having the higher radio wave quality in order to select the communication whose communication speed is not lowered even for a short time, that is, the stable communication (corresponding to the step S20k of the flowchart shown in FIG. 7), and determines that hand-over is carried out (corresponding to the step S20f of the flowchart of FIG. 7).

The mobile communication terminal 1 further moves to the first base station 3a, and at a position Y4, the quality of the radio wave transmitted from the first base station 3a is higher than the quality of the radio wave transmitted from the second base station 3b, and the throughput based on the communication with the first base station 3a exceeds the throughput based on the communication with the second base station 3b.

At this time, when the data communication being carried out is the communication based on the file transfer system by the electronic mail transceiver 17, the mobile communication terminal 1 judges that it is suitable to communicate with the first base station 3a (corresponding to the step S20k of the flowchart shown in FIG. 7), and determines that hand-over is carried out (corresponding to the step S20f of the flowchart of FIG. 7).

On the other hand, when the data communication being carried out is the communication based on the stream system by the stream reproducing portion 18, the mobile communication terminal 1 judges that it is suitable to continue the communication with the second base station 3b (corresponding to the step S20k of the flowchart of FIG. 7), and determines that no hand-over is carried out (corresponding to the step S20g of the flowchart of FIG. 7).

The mobile communication terminal 1 further moves to the first base station 3a, and at a position Y5, the quality of the radio wave transmitted from the second base station 3b is lower than a predetermined value and thus it is impossible to communicate with the second base station 3b, that is, the throughput based on the communication with the second base station 3b is equal to zero.

In the foregoing description, it is assumed that when the mobile communication terminal 1 approaches from the neighboring position of the second base station 3b to the neighboring position of the first base station 3a, the quality of the radio wave transmitted from the first base station 3a becomes higher than the quality of the radio wave transmitted from the second base station 3b, and then the throughput based on the communication with the first base station 3a becomes larger than the throughput based on the communication with the second base station 3b.

Therefore, when the data communication being carried out is the communication based on the stream system by the stream reproducing portion 18, it is more early determined that hand-over is carried out as compared with the case where the data communication being carried out is the communication based on the file transfer system by the electronic mail transceiver 17.

However, when the throughput based on the communication with the first base station 3a becomes larger than the throughput based on the communication with the second base station 3b and then the quality of the radio wave transmitted from the first base station 3a becomes higher than the quality of the radio wave transmitted from the second base station 3b, conversely to the above-described case, it is more early determined that the hand-over is carried out as compared with the case where the data communication being carried out is the communication based on the file transfer system by the electronic mail transceiver 17 and the case where the data communication being carried out is the communication based on the stream system by the stream reproducing portion 18.

Second Embodiment

Next, a second embodiment of the mobile communication terminal 1 and the control station 2 will be described with reference to the accompanying drawings. The same parts as the mobile communication terminal 1 according to the first embodiment and the control station 2 according to the first embodiment are represented by the same reference numerals, and the description thereof is omitted.

Figure 9:
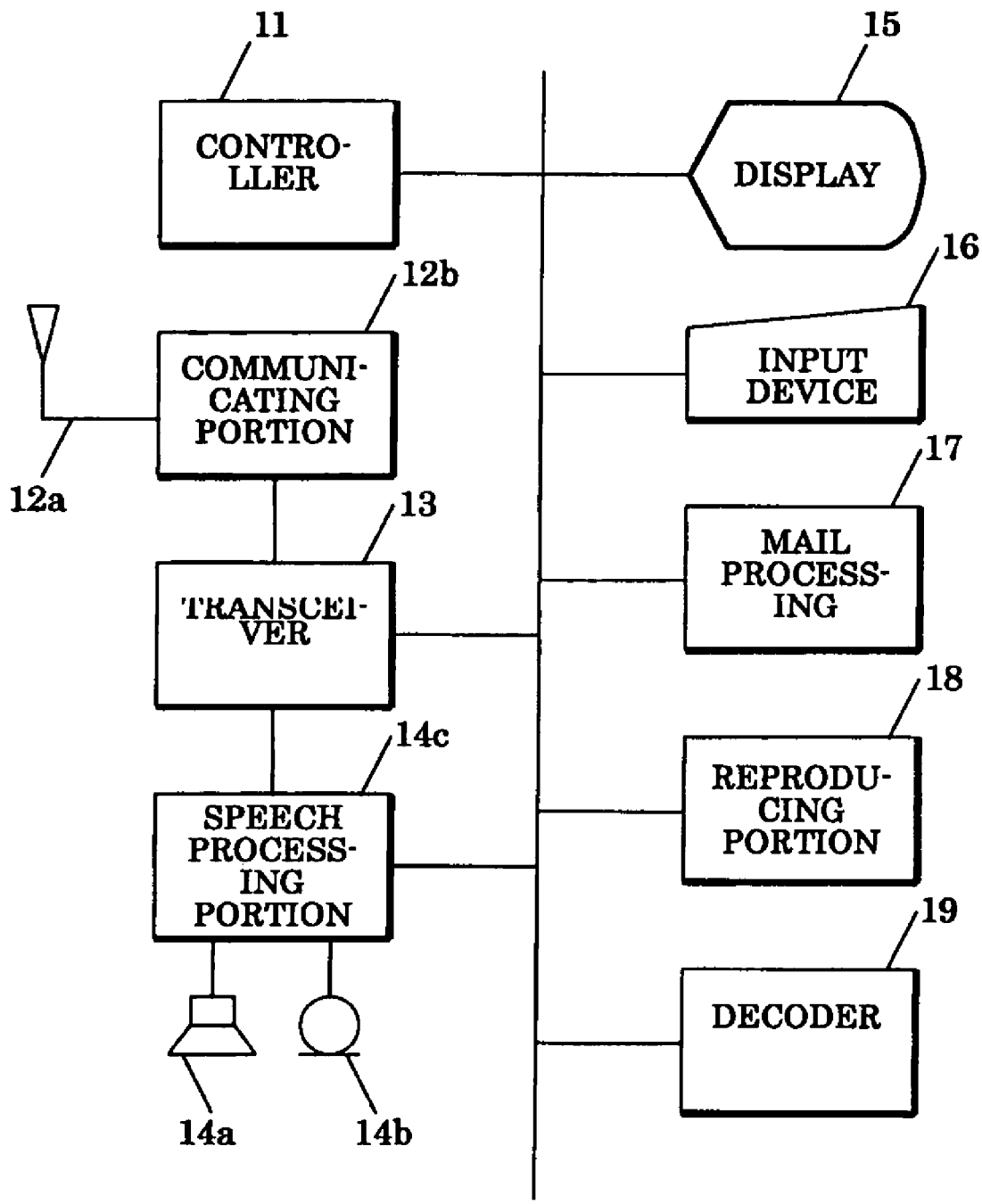
FIG. 9 is a block diagram showing the configuration of the mobile communication terminal according to the second embodiment.

FIG. 9 is a block diagram showing the construction of the mobile communication terminal 1 according to a second embodiment.

As compared with the mobile communication terminal 1 according to the first embodiment, the mobile communication terminal 1 is designed to have a controller 11b in place of the controller 11, have a transceiver 13b in place of the transceiver 13, and have no hand-over judging portion 20.

Figure 10:
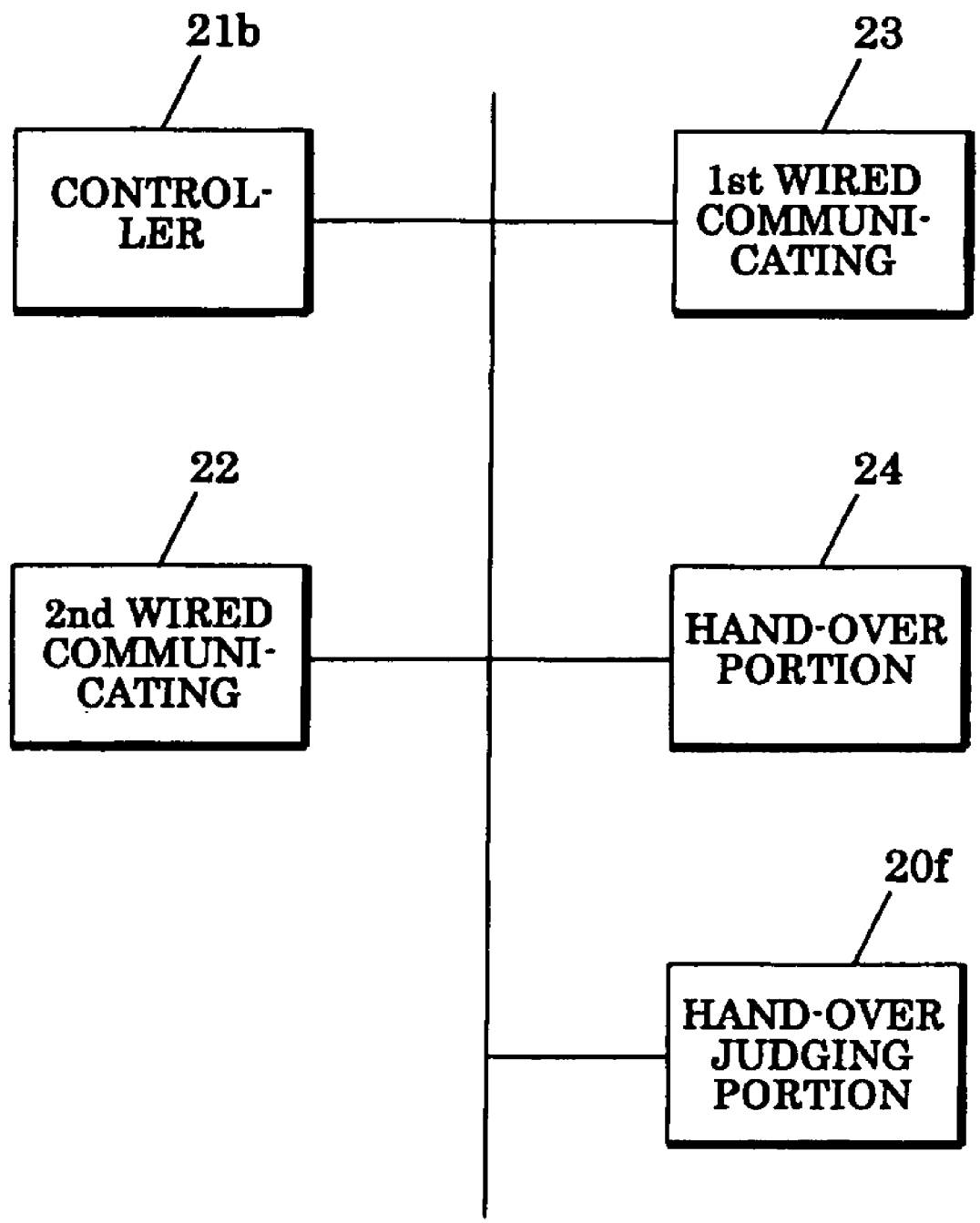
FIG. 10 is a block diagram showing the hand-over judging portion according to the second embodiment.

FIG. 10 is a block diagram showing the configuration of the control station 2 according to the second embodiment.

As compared with the control station 2 of the first embodiment, the control station 2 of the second embodiment is designed to have a controller 21b in place of the controller 21 and further have a hand-over judging portion 20f.

Figure 11:
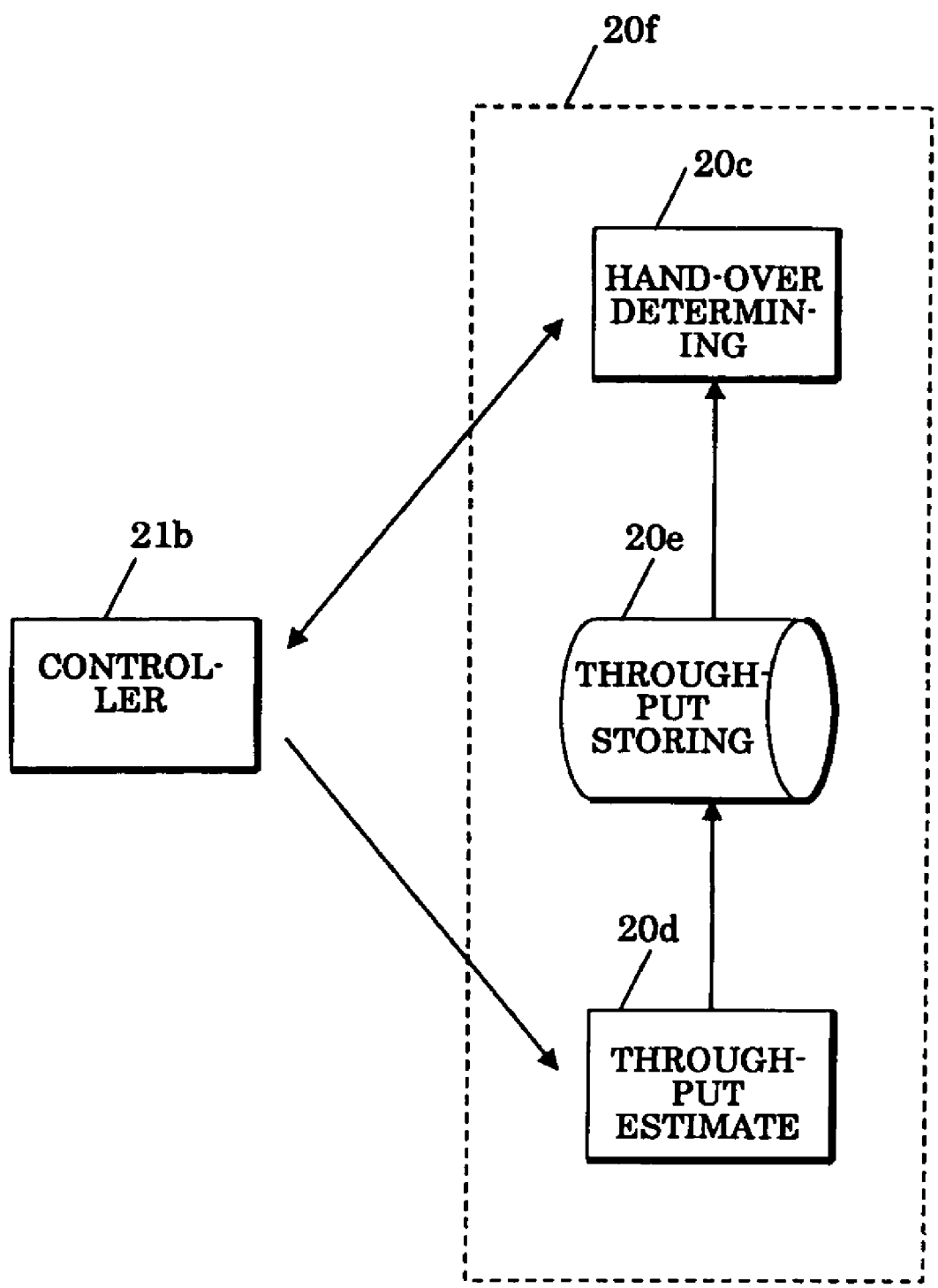
FIG. 11 is a block diagram showing the detailed configuration of the hand-over judging portion 20f.

FIG. 11 is a block diagram showing the detailed configuration of the hand-over judging portion 20f. The hand-over necessity judging portion 20f comprises a hand-over necessity determining portion 20c connected to the controller 21b, and a throughput estimating portion 20d connected to the controller 21b, and the throughput estimated by the throughput estimating portion 20d is stored in the throughput storage portion 20e. As compared with the hand-over judging portion 20 of the first embodiment, the hand-over judging portion 20f is designed to have neither the received radio wave quality measuring portion 20a nor the reception signal error rate measuring portion 20b.

The operation of each part of the mobile communication terminal 1 according to the second embodiment and the control station 2 according to the second embodiment will be described with reference to FIG. 9 to FIG. 11. First, the operation of each part constituting the mobile communication terminal 1 will be described with reference to FIG. 9.

As described with reference to the operation of the mobile communication terminal 1 according to the first embodiment, the controller 11b detects which one of the two functions, that is, the electronic mail processing function 17 and the stream reproducing portion 18 is activated, and also detects the throughput of the data communication of each function. Then, it transmits the information regarding the activated function and the throughput thereof through the first base station 3a and the second base station 3b to the control station 2 at a predetermined time interval.

The transceiver 13b subjects the high frequency signal from the communicating portion 12b to amplification, frequency conversion and demodulation, and transmits a digital audio signal thus achieved to a calling portion 14c while transmitting digital data signal and a control signal to the controller 11. Furthermore, the digital audio signal output from the calling portion 14c, and the digital data signal and the control signal output from the controller 11 are subjected to modulation, frequency conversion and amplification to achieve high frequency signals, and then transmit the high frequency signals to the communicating portion 12b.

Furthermore, the transceiver 13b measures the quality of the common pilot signal transmitted from the first base station 3a and the quality of the common pilot signal transmitted from the second base station 3b. The transceiver 13b transmits the quality thus achieved to the control station 2 through the first base station 3a or the second base station 3b. The error rate of the demodulated signal transmitted from the first base station 3a and the error rate of the demodulated signal transmitted from the second base station 3b are measured. The error rate thus achieved is transmitted to the control station 2 through the first base station 3a or the second base station 3b.

Next, the operation of each part of the control station 2 according to the second embodiment will be described with reference to FIG. 10 and FIG. 11. The controller 21b detects the mobile communication system with which the mobile communication terminal 1 communicates. Furthermore, the controller 21b receives the control signal indicating the activated function in the mobile communication terminal 1 and the control signals indicating the throughputs of the data communication of the activated function, and transmits these signals to the hand-over determining portion 20c of the hand-over judging portion 20f and the throughput estimating portion 20d.

Furthermore, the controller 21b receives the control signal indicating the quality of the common pilot signal received in the mobile communication terminal 1 and the control signal indicating the error rate of the signal received in the mobile communication terminal 1, and transmits these signals to the hand-over determining portion 20c of the hand-over judging portion 20f and the throughput estimating portion 20d. Still furthermore, the controller 21b receives a signal which is transmitted from the hand-over judging portion 20f and indicates that the hand-over is carried out, and transmits the signal to the hand-over portion 24.

In the first embodiment, the throughput estimating portion 20d of the hand-over judging portion 20f receives the signal transmitted from the received radio wave quality measuring portion 20a and the signal transmitted from the reception signal error rate measuring portion 20b. However, in the second embodiment, the throughput estimating portion 20d receives the signal transmitted from the controller 21b in place of the above signals. The operation is the same as the first embodiment.

In the first embodiment, the hand-over determining portion 20c of the hand-over judging portion 20f receives the signal transmitted from the received radio wave quality measuring portion 20a, the signal transmitted from the reception signal error rate measuring portion 20b, and the signal transmitted from the controller 11, however, in the second embodiment, it receives the signal transmitted from the controller 21b in place of the above signals. Furthermore, In the first embodiment, the determination is transmitted to the controller 11, however, in the second embodiment, the determination is transmitted to the controller 21b in place of the controller 11. The operation is the same as the first embodiment.

In the foregoing description, when carrying out data communication based on the stream system, the mobile communication terminal 1 judges a base station based on the mobile communication system having a high throughput as being suitable, and when carrying out data communication based on the file transfer system, the mobile communication terminal 1 judges a base station based on the mobile communication system having high radio wave quality as being suitable. Furthermore, when the base stations judged as being suitable is different from the base station with which the mobile communication terminal 1 is communicating, the hand-over is carried out. However, the present invention is not limited to the above case.

For example, in a case where the function indicating the maximum value of the throughput and the function indicating the minimum value of the throughput are stored in the throughput storage portion 20e, the mobile communication terminal 1 may judge a base station based on the mobile communication system having the higher maximum value of the throughput as being suitable when carrying out data communication based on the file transfer system, and may carry out hand-over when the base station judged as being suitable is different from the base station under communication.

The present invention is not limited to the above-described embodiments, and various modifications may be made without departing from the subject matter of the present invention.

What is claimed is:

1. A mobile communication terminal capable of selectively communicating with one of a plurality of base stations corresponding to respective different communication standards, the mobile communication terminal comprising:
 a receiving unit which receives radio signals from the plurality of base stations corresponding to the respective different communication standards;
 a measuring unit which measures signal qualities of the received radio signals, respectively;
 a storage unit which stores a relationship between the signal quality and data throughput for each of the different communication standards;
 an estimating unit which estimates respective data throughputs of the plurality of base stations corresponding to the respective different communication standards, based on the signal qualities measured by the measuring unit and the relationships stored in the storage unit; and
 a hand-over judging unit which determines which one of the plurality of base stations corresponding to the respective different communication standards that the mobile communication terminal should connect to, based on the data throughputs estimated by the estimating unit.

2. The mobile communication terminal according to claim 1, wherein the hand-over judging unit determines that the mobile communication terminal should connect to the one of the plurality of base stations that has been estimated by the estimating unit to have a highest data throughput of the plurality of base stations.

3. The mobile communication terminal according to claim 1, wherein the hand-over judging unit determines that the mobile communication terminal should connect to the one of the plurality of base stations that has been estimated by the estimating unit to have a highest data throughput of the plurality of base stations, when the signal qualities of all of the received radio signals are higher than a predetermined value.

4. The mobile communication terminal according to claim 1, wherein whether or not the data throughput increases as the signal quality increases depends on the communication standard.

5. The mobile communication terminal according to claim 1, wherein the different communication standards comprise a first communication standard in which the data throughput is equal to a fixed value when the signal quality is greater than or equal to a predetermined value, and a second communication standard in which the data throughput increases as the signal quality increases.

6. The mobile communication terminal according to claim 1, wherein the different communication standards comprise the Global System for Mobile communications (GSM) standard and the Wideband Code Division Multiple Access (WCDMA) standard; and wherein the hand-over judging unit determines that the mobile communication terminal should connect to the base station belonging to the WCDMA standard when the data throughput of the base station belonging to the WCDMA standard estimated by the estimating unit is higher than the maximum data throughput of the base station belonging to the GSM standard.

7. The mobile communication terminal according to claim 1, wherein the signal quality measured by the measuring unit is a received signal strength indicator.

8. The mobile communication terminal according to claim 1, wherein the different communication standards comprise a cellular type mobile communication standard and a wireless Local Area Network (LAN) type communication standard.

9. A mobile communication terminal capable of selectively communicating with one of a plurality of base stations corresponding to respective different communication standards, the mobile communication terminal comprising:
   a receiving unit which receives radio signals from the plurality of base stations corresponding to the respective different communication standards;
   a measuring unit which measures error rates of the received radio signals, respectively;
   a storage unit which stores a relationship between the error rate and data throughput for each of the different communication standards;
   an estimating unit which estimates respective data throughputs of the plurality of base stations corresponding to the respective different communication standards, based on the error rates measured by the measuring unit and the relationships stored in the storage unit; and
   a hand-over judging unit which determines which one of the plurality of base stations corresponding to the respective different communication standards that the mobile communication terminal should connect to, based on the data throughputs estimated by the estimating unit.

10. The mobile communication terminal according to claim 9, wherein the different communication standards comprise a cellular type mobile communication standard and a wireless Local Area Network (LAN) type communication standard.

11. A method for selecting a base station for a mobile communication terminal to communicate with from a plurality of base stations corresponding to respective different communication standards, the method comprising:
   receiving radio signals from the plurality of base stations corresponding to the respective different communication standards;
   measuring signal qualities of the received radio signals, respectively;
   storing a relationship between the signal quality and data throughput for each of the different communication standards;
   estimating respective data throughputs of the plurality of base stations corresponding to the respective different communication standards, based on the measured signal qualities and the stored relationships; and
   determining which one of the plurality of base stations corresponding to the respective different communication standards that the mobile communication terminal should connect to, based on the estimated data throughputs.

* * * * *